United States Patent
Shi et al.

(10) Patent No.: US 8,023,747 B2
(45) Date of Patent: Sep. 20, 2011

(54) METHOD AND APPARATUS FOR A NATURAL IMAGE MODEL BASED APPROACH TO IMAGE/SPLICING/TAMPERING DETECTION

(75) Inventors: Yun-Qing Shi, Millburn, NJ (US); Chunhua Chen, Harrison, NJ (US)

(73) Assignee: New Jersey Institute of Technology, Newark, NJ (US)

( * ) Notice: Subject to any disclaimer, the term of this patent is extended or adjusted under 35 U.S.C. 154(b) by 1259 days.

(21) Appl. No.: 11/673,529

(22) Filed: Feb. 9, 2007

(65) Prior Publication Data
US 2008/0193031 A1    Aug. 14, 2008

(51) Int. Cl.
*G06K 9/36* (2006.01)
*G06K 9/00* (2006.01)

(52) U.S. Cl. ....................................... 382/232; 382/100

(58) Field of Classification Search .......... 382/232–233, 382/170, 168, 100, 155–160, 190, 195, 280, 382/224, 288; 348/91, 460, 552; 345/634, 345/763, 838, 859, 647; 713/16–181; 380/54, 380/246, 252–255
See application file for complete search history.

(56) References Cited

U.S. PATENT DOCUMENTS

| | | | |
|---|---|---|---|
| 5,533,138 A | 7/1996 | Kim et al. | |
| 6,628,821 B1 | 9/2003 | Covell et al. | |
| 6,678,322 B1 | 1/2004 | Mihara | |
| 6,831,990 B2 * | 12/2004 | Marvel et al. | ................. 382/100 |
| 6,975,733 B1 | 12/2005 | Choi et al. | |
| 6,983,057 B1 | 1/2006 | Ho et al. | |
| 7,200,592 B2 | 4/2007 | Goodwin et al. | |
| 7,280,669 B2 * | 10/2007 | Choi et al. | ..................... 382/100 |
| 7,778,461 B2 * | 8/2010 | Shi et al. | ........................ 382/170 |
| 2002/0183984 A1 | 12/2002 | Deng et al. | |
| 2007/0189600 A1 | 8/2007 | Shi et al. | |
| 2007/0189608 A1 | 8/2007 | Shi et al. | |
| 2007/0258618 A1 | 11/2007 | Shi et al. | |
| 2008/0037823 A1 * | 2/2008 | Shi et al. | ....................... 382/100 |

OTHER PUBLICATIONS

The International Search Report and The Written Opinion of the International Searching Authority issued in connection with related International Application No. PCT/US2008/053381 on Jul. 15, 2008.
Shi, et al., "A Markov Process Based Approach to Effective Attacking JPEG Steganography", Information Hiding Workshop 2006, Old Town Alexandria, VA, USA, Jul. 10-12, 2006.
Zou, et al., "Steganalysis Based on Markov Model of Thresholded Prediction-Error Image", ECE Dept., New Jersey Institute of Technology, Newark, New Jersey, USA, Computer Science Department, Tongji UniversityShanghai, China.

(Continued)

*Primary Examiner* — Ishrat I Sherali
(74) *Attorney, Agent, or Firm* — Connolly Bove Lodge & Hutz LLP

(57) ABSTRACT

Embodiments of the invention are directed toward methods for an effective blind, passive, splicing/tampering detection. The methods of the various embodiments of the invention use a natural image model to detect image splicing/tampering with a model that is based on statistical features extracted from a given test image and multiple 2-D arrays generated by applying the block discrete cosine transform (BDCT) with several different block-sizes to the test images. Experimental results have demonstrated that the new splicing detection scheme outperforms state-of-the-art methods by a significant margin when applied to the Columbia Image Splicing Detection Evaluation Dataset.

46 Claims, 8 Drawing Sheets

OTHER PUBLICATIONS

Shi, et al., Image Steganalysis Based on Moments of Characteristic Functions Using Wavelet Decomposition, Prediction-Error Image, and Neural Network, IEEE International Conference on Multimedia & Expo 2005, Amsterdam, Netherlands, Jul. 2005.

Ng, et al., "Blind Detection of Photomontage Using Higher Order Statistics", IEEE International Symposium on Circuits and Systems 2004, Vancouver, BC, Canada, May 2004.

Chen, et al., "Statistical Moments Based Universal Steganalysis Using JPEG 2-D Arrary and 2-D Characteristic Function", IEEE International Conference on Image Processing 2006, Atlanta, GA, USA, Oct. 8-11, 2006.

International Preliminary Report on Patentability and Written Opinion issued in related International Application No. PCT/US2008/053381 on Aug. 29, 2009.

Xuan et al. "Steganalysis Based on Multiple Features Formed by Statistical Moments of Wavelet Characteristics Functions", Information Hiding Lecture Notes in Computer Science;; LNCS, Springer-Verlag, BE, vol. 3727, Jan. 1, 2005 pp. 262-277, XP019019918 ISBN: 978-3-540-29039-1 abstract p. 264, section 2.2 "Moments of Wavelet Characteristic Funtions for Steganalysis".

"Detecting hidden messages using higher-order statistical models," Farid, 2002, IEEE, vol. 2, pp. 905-908.

"Steganalysis of Additive Noise Modelable Information Hiding," Harmsen, Apr. 2003, Rensselaer Polytechnic Institute, pp. 1-50.

International Preliminary Report on Patentability issued in International Application No. PCT/US2006/001393 on Apr. 28, 2009.

International Search Report and Written Opinion issued in International Application No. PCT/US06/01393 on Jul. 15, 2008.

Written Opinion issued in International Application PCT/US2008/051384 on Sep. 15, 2008.

L. Bradford et al.: "An Introduction to Wavelets," Sep. 1992, Hewlett Packard (HPL-92-124) h-Instruments and Photonics Laboratory, XP002493744, p. 2, paragraph 2, p. 3, paragraph 1, p. 6, paragraph 1.

WO 2006/0813386A (Mak Aquisitions LLC [US]; Shi Yun-Qing [US]; Xuan Guorong [CN] Aug. 3, 2006 , p. 5, lines 7-17.

Livens S. et al.: "Wavelets for texture analysis, an overview," Image Processing and its Applications Sixth International Conference on, Dublin, Ireland Jul. 14-17, 1997, IEE, UK, vol. 2, pp. 581-585, XP006508359 abstract.

Siwei Lyu et al.: "Detecting hidden messages using higher-order statistics and support vector machines," Information Hiding, 5th International Workshop, IH 2002, Revised Papers (Lecture notes in Computer Science, vol. 2578) Springer Verlag Berlin, Germany, 2002, pp. 340-354, XP002493743, p. 341, paragraphs 2-3.

M. Weinberger et al., "LOCO-I: A Low Complexity Content-Based Lossless Image Compression Algorithm," Proc. of IEEE Data Compression Conf., pp. 140-149, 1996.

* cited by examiner

US 8,023,747 B2

METHOD AND APPARATUS FOR A NATURAL IMAGE MODEL BASED APPROACH TO IMAGE/SPLICING/TAMPERING DETECTION

BACKGROUND OF THE INVENTION

1. Field of the Invention

Embodiments of the invention are directed toward an apparatus and methods for an effective blind, passive, splicing/tampering detection. In particular, various embodiments of the invention relate to apparatus and methods for the use of a natural image model to detect image splicing/tampering where the model is based on statistical features extracted from a given test image and multiple 2-D arrays generated by applying the block discrete cosine transform (DCT) with several different block-sizes to the test images.

2. Description of Background Art

Replacing one or more parts of a host picture with fragment(s) from the same host picture or other pictures is called a photomontage or image tampering. Image tampering may be defined as a malicious manipulation of an image to forge a scene that actually never happened in order to purposely mislead observers of the image.

Image splicing is a simple and commonly used image tampering scheme for the malicious manipulation of images to forge a scene that actually never exists in order to mislead an observer. Image splicing is often a necessary step in image tampering. In image splicing, a new image is formed by cropping and pasting regions from the same or different image sources. Modern digital imaging techniques have made image splicing easier than ever before. Even without post-processing of the image, image splicing detection can hardly be caught by human visual systems. Hence, high probability of detection of image splicing detection is urgently needed to tell if a given image is spliced without any a priori knowledge. That is, image splicing/tampering detection should be blind in nature.

Researchers recently have made efforts on image splicing detection due to the increasing needs of legal forensics. For example, a method on blind splicing detection has been reported in T.-T. Ng, S.-F. Chang, and Q. Sun, "Blind detection of photomontage using higher order statistics," IEEE International Symposium on Circuits and Systems 2004, Vancouver, BC, Canada, May, 2004. However, the reported results of a 72% success rate for tampering detection over the Columbia Image Splicing Detection Evaluation Dataset are not satisfactory for image splicing/tampering detection.

Another background art approach, utilizing statistical moments of characteristic functions has been reported in Y. Q. Shi, G. Xuan, D. Zou, J. Gao, C. Yang, Z. Zhang, P. Chai, W. Chen, and C. Chen, "Steganalysis based on moments of characteristic functions using wavelet decomposition, prediction-error image, and neural network", IEEE International Conference on Multimedia & Expo 2005, Amsterdam, Netherlands, July, 2005. In this approach, 78-dimensional (78-D) feature vectors are used for universal steganalysis. The first half of features are generated from the given test image and its 3-level Haar wavelet decomposition. The second half of features are derived from the prediction-error image and its 3-level Haar wavelet decomposition. Considering the image and its prediction-error image as the LL0 (Low-Low 0) subbands, there are 26 subbands totally. The characteristic function (CF) (i.e., the discrete Fourier transform (DFT) of the histogram) of each of these subbands is calculated. The first three moments of these CFs are used to form the 78-D feature vectors. The above-mentioned steganalysis scheme provides good results when attacking data hiding algorithms operating in the spatial domain but further improvement in detection probability performance is desirable.

Based on the above discussed features, a more advanced technology has been developed in C. Chen, Y. Q. Shi, and W. Chen, "Statistical moments based universal steganalysis using JPEG 2-D array and 2-D characteristic function," IEEE International Conference on Image Processing 2006, Atlanta, Ga., USA, Oct. 8-11, 2006. In this background art method, 390-dimensional (390-D) feature vectors are developed for universal steganalysis. These 390-D features consist of statistical moments derived from both image spatial 2-D array and JPEG 2-D array, formed from the magnitudes of JPEG quantized block discrete cosine transform (DCT) coefficients. In addition to the first order histogram, the second order histogram is also considered and utilized. Consequently, the moments of 2-D CF's are included for steganalysis. Extensive experimental results have shown that this steganalysis method outperforms in general the background art in attacking modern JPEG steganography including OutGuess, F5, and MB1. However, as with the above, further improvements in detection performance is desirable.

In our own background art developments, we have developed a powerful steganalyzer to effectively detect the advanced JPEG steganography in Y. Q. Shi, C. Chen, and W. Chen, "A Markov process based approach to effective attacking JPEG steganography", Information Hiding Workshop 2006, Old Town Alexandria, Va., USA, Jul. 10-12, 2006. In this work, we first choose to work on the image JPEG 2-D array. Difference JPEG 2-D arrays along horizontal, vertical, and diagonal directions are then used to enhance changes caused by JPEG steganography. Markov processes are then applied to modeling these difference JPEG 2-D arrays so as to utilize the second order statistics for steganalysis. In addition to the utilization of difference JPEG 2-D arrays, a thresholding technique is developed to greatly reduce the dimensionality of transition probability matrices, i.e., the dimensionality of feature vectors, thus making the computational complexity of the proposed scheme manageable. Experimental results have demonstrated that this scheme has outperformed the existing steganalyzers in attacking OutGuess, F5, and MB1 by a significant margin. However, as with the above, further improvement in detection performance is desirable.

From the discussion above, it is clear that image splicing detection is of fundamental importance in the art of image splicing/tampering detection. The blind splicing detection methods of the background art have typically achieved a probability of successful detection rate of 72%-82% against the Columbia Image Splicing Detection Evaluation Dataset. Thus, there is a need in the art for further improvement in image splicing/tampering detection performance with blind methods for authenticating images.

SUMMARY OF THE INVENTION

Embodiments of the invention are directed at overcoming the foregoing and other difficulties encountered by the background arts. In particular, embodiments of the invention provide methods for blind splicing/tampering detection based on a natural image model. The methods are based on statistical features extracted from the given image and its multi-block-sized block discrete cosine transform coefficient 2-D arrays and utilizing machine learning to provide excellent splicing detection capability. In embodiments of the invention, splicing detection is a part of a two-class method for pattern recognition. That is, a given image is classified as either a spliced image or a non-spliced (authentic) image. Experimental results that are further discussed below have shown that the embodiments of the invention can greatly outperform background art techniques when applied to the same image database (i.e., the Columbia Image Splicing Detection Evaluation Dataset) with a probability of successful detection rate of 92% over the Columbia Image Splicing Detection Evaluation Dataset.

Further, embodiments of the invention provide improvements in the apparatus and methods for detection of image splicing/tampering that combine features extracted from the spatial representation; and the computation of multiple block discrete cosine transform (MBDCT) with different block sizes. In addition, embodiments of the invention also combine features from the 1-D characteristic function, the 2-D characteristic function, moments and the discrete wavelet transform.

In particular, the spatial representation of the given test image (i.e., an image pixel 2-D array) is input to embodiments of the invention and statistical moments of characteristic functions are extracted from this 2-D array. Further, the block discrete cosine transform (BDCT) is applied, with a set of different block sizes, to the test image, resulting in a group of image BDCT 2-D arrays, also called group BDCT representations, each consisting of all of BDCT coefficients from all of non-overlapping blocks. This group of BDCT 2-D arrays is referred to as multi-size BDCT 2-D arrays, or MBDCT 2-D arrays for short. From these MBDCT 2-D arrays, statistical moments of characteristic functions and Markov process based features are extracted.

One exemplary embodiment of the invention is a method for detecting image tampering comprising: inputting a two-dimensional (2-D) spatial representation of the image; generating non-overlapping, N×N block decompositions of the spatial representation of the image; applying a block discrete cosine transform (BDCT) to each of the non-overlapping, N×N block decompositions; determining BDCT coefficient arrays derived from the coefficients of all non-overlapping, N×N block decompositions; extracting moments of a characteristic function from the spatial representation of the image and each of the BDCT coefficient 2-D arrays; extracting the transition probability from the 8×8 BDCT coefficient 2-D array; generating features based at least on the extracted moments of the characteristic function and the extracted Markov transition probabilities; and classifying the image based at least on the generated features. Preferably, in an exemplary embodiment of the invention: the block size N×N, with N being at least one of 2, 4, and 8 with respect to the Columbia Image Splicing Detection Evaluation Dataset.

Yet another exemplary embodiment of the invention is a processor-readable medium containing software code that, when executed by a processor, causes the processor to implement a method for steganalysis of an image comprising: inputting a two-dimensional (2-D) spatial representation of the image; generating non-overlapping, N×N block decompositions of the spatial representation of the image; applying block discrete cosine transform (BDCT) to each of the non-overlapping, N×N block decompositions; determining BDCT coefficient 2-D arrays for each N×N block; extracting moments of a characteristic function from the spatial representation of the image and each of the BDCT coefficient 2-D arrays; generating features based at least on the extracted moments of the characteristic function; and classifying the image based at least on the generated features.

Yet another exemplary embodiment further comprises: determining a prediction-error 2-D array for at least one of the spatial representation 2-D array, and the BDCT coefficient 2-D arrays; computing a wavelet transform (e.g., DWT) for at least one of the spatial representation 2-D array of the image, and the BDCT coefficient 2-D arrays, and the prediction-error 2-D array; rounding at least one of the spatial representation 2-D array of the image and the BDCT coefficient 2-D arrays; 2-D histogram the rounding function output; determining at least one of horizontal, vertical, diagonal and minor diagonal 2-D histograms from at least one of the spatial representation 2-D array of the image and the BDCT coefficient 2-D arrays; subband processing at least one of the spatial representation 2-D array of the image and the BDCT coefficient 2-D arrays, the prediction error function output, and the 1-level DWT function output; histogramming the outputs of the subband processing functions; applying a discrete Fourier transform (DFT) to the histograms; applying a 2-D DFT to the 2-D histograms; determining at least one of the first order, second order and third order moments from the characteristic function (i.e., with the discrete Fourier transform of the histogram); and determining at least one of the first order, second order and third order marginal moments from the characteristic function; and generating features based at least on the moments.

Preferably, the wavelet transform of the above-discussed exemplary embodiments uses a one-level discrete wavelet transform. Alternatively, two-level and three-level discrete wavelet transforms can be used. In addition, in these exemplary embodiments, the wavelet transform is at least one of a Haar wavelet, Daubechies 9/7 wavelet, integer 5/3 wavelet, and other wavelets.

Another exemplary embodiment of the invention is a method further comprising: computing sign and magnitude for at least one of the spatial representation 2-D array of the image, the BDCT coefficient 2-D arrays and the JPEG coefficient 2-D arrays; computing an expression $|a|+|b|-|c|$; and determining the product of the expression and the sign.

Yet another embodiment of the invention is an apparatus comprising: means for generating features based at least in part on moments of a characteristic function of said image; and means for classifying said image based at least in part on said generated features. Preferably said means for generating features comprises means for generating features based at least in part on moments of a set of decomposition of images. Preferably said set of decomposition of images is based at least in part on at least one of the discrete wavelet transform or the Haar wavelet transform. Preferably, the means for classifying comprises a means for classifying an image as either a stego-image or a non-stego image. Preferably said means for generating features includes means for generating a prediction error based at least in part on said image.

Another embodiment of the invention is an apparatus comprising: means for applying a trained classifier to an image; and means for classifying said image based at least in part on applying a trained classifier to a host of features generated from said image. Preferably, the means for classifying comprises means for classifying based at least in part on applying a trained classifier comprising at least one of a trained Support Vector Machine (SVM) classifier, a trained neural network classifier and a trained Bayes classifier. Preferably, the means for classifying includes means for classifying based at least in part on a host of features generated from a prediction error of said image.

BRIEF DESCRIPTION OF THE DRAWINGS

FIG. 1A-2 is another exemplary integrated block diagram for input images in a JPEG representation.

FIG. 1C-1 is a table of the prediction error context and FIG. 1C-2 is an exemplary block diagram of a prediction-error 2-D array generation.

DETAILED DESCRIPTION OF THE INVENTION

In the background art of U.S. patent application Ser. No. 11/340,419, a steganalysis scheme utilizing statistical moments of characteristic functions of test image, its prediction-error image, and all of their wavelet subbands has been proposed, in which 78-D feature vectors are used for universal steganalysis. While this implementation performs well when the data is hidden in raw images, this universal steganalyzer does not perform well in attacking modern JPEG steganography such as OutGuess, F5 and model based (MB).

In U.S. patent application Ser. No. 11/331,767 to Shi and Chen, which is incorporated herein by reference, a method for identifying marked images using based at least in part on frequency domain coefficient differences is disclosed. To effectively detect the modern JPEG steganography, a Markov process based steganalyzer will be utilized. The JPEG 2-D array, which is formed from the magnitude of the JPEG coefficient of a given JPEG image, is first formed from the given test image. Difference JPEG 2-D arrays along horizontal, vertical, and diagonal directions are used to enhance changes caused by JPEG steganography. A Markov process is then applied to modeling these difference JPEG 2-D arrays so as to utilize the second-order statistics for steganalysis. Experimental results have demonstrated that this scheme has outperformed the background art in attacking modern JPEG steganography by a significant margin.

In U.S. patent application Ser. No. 11/624,816 to Shi and Chen, which is herein incorporated by reference, an approach to improve the performance of a universal steganalyzer in attacking the modern JPEG steganography and a more advanced universal steganalyzer has been developed. In addition to 78 features proposed above, features from statistical moments derived from the JPEG 2-D array, which is formed from the magnitude of the JPEG coefficient array of a given JPEG image. In addition to the first-order histogram, the second-order histogram is also utilized. That is, the moments of 2-D characteristic functions are included for steganalysis. Extensive experimental results have shown that this universal steganalysis method performs well in attacking the modern JPEG steganographic tools.

The main characteristics of the general natural image model of the embodiments of the invention lie in the following two combinations: (1) the combination of features derived from the image spatial representation and features derived from the MBDCT representations; and (2) the combination of moments of characteristic functions based features and Markov process based features. The experimental results shown later in below indicate that the features generated from the MBDCT 2-D arrays can greatly improve the splicing detection performance.

Figures 1, 1A:
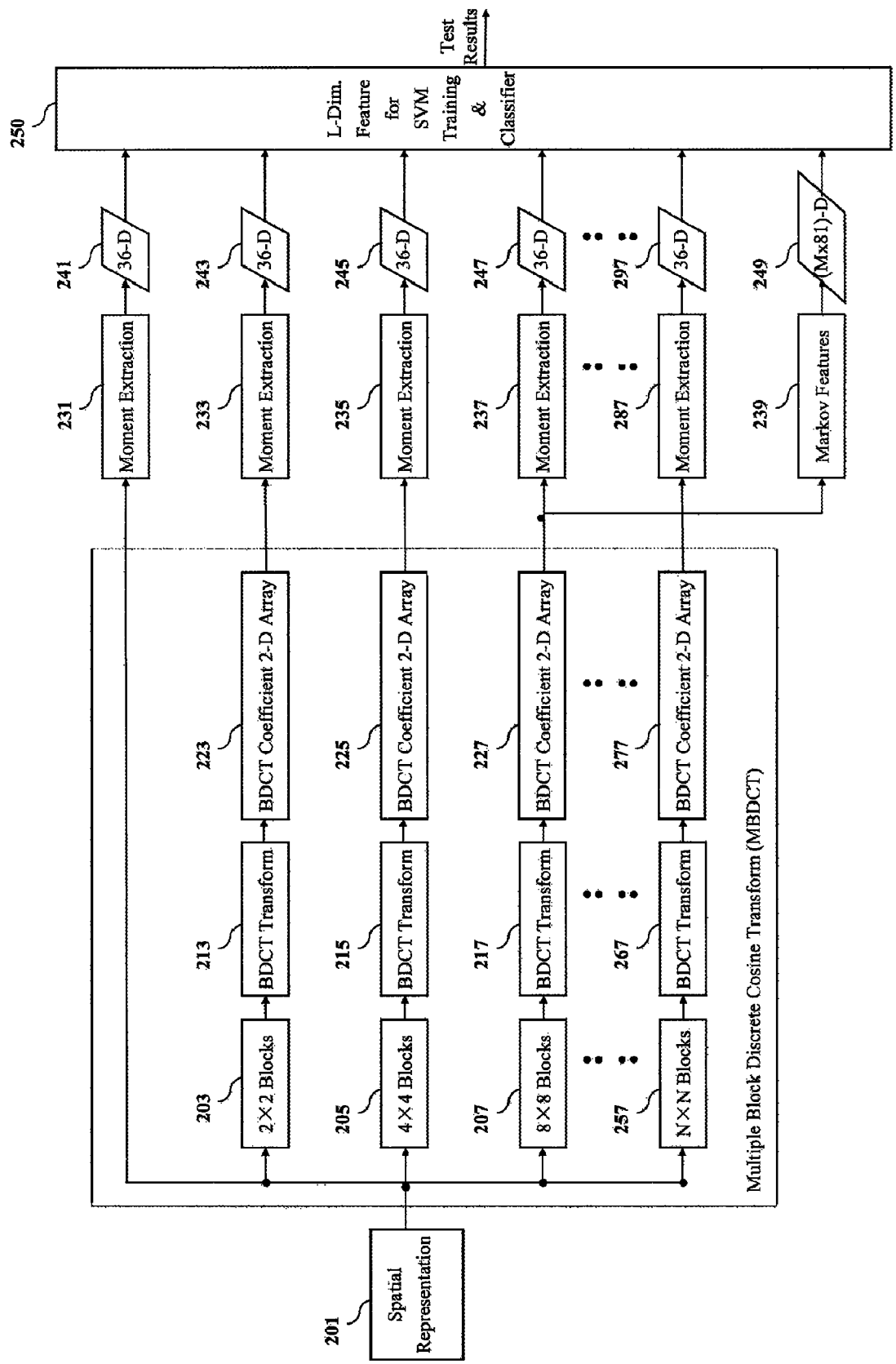
FIG. 1A-1 is an exemplary integrated block diagram for input images in a spatial representation.
Figures 1, 1A, 2:
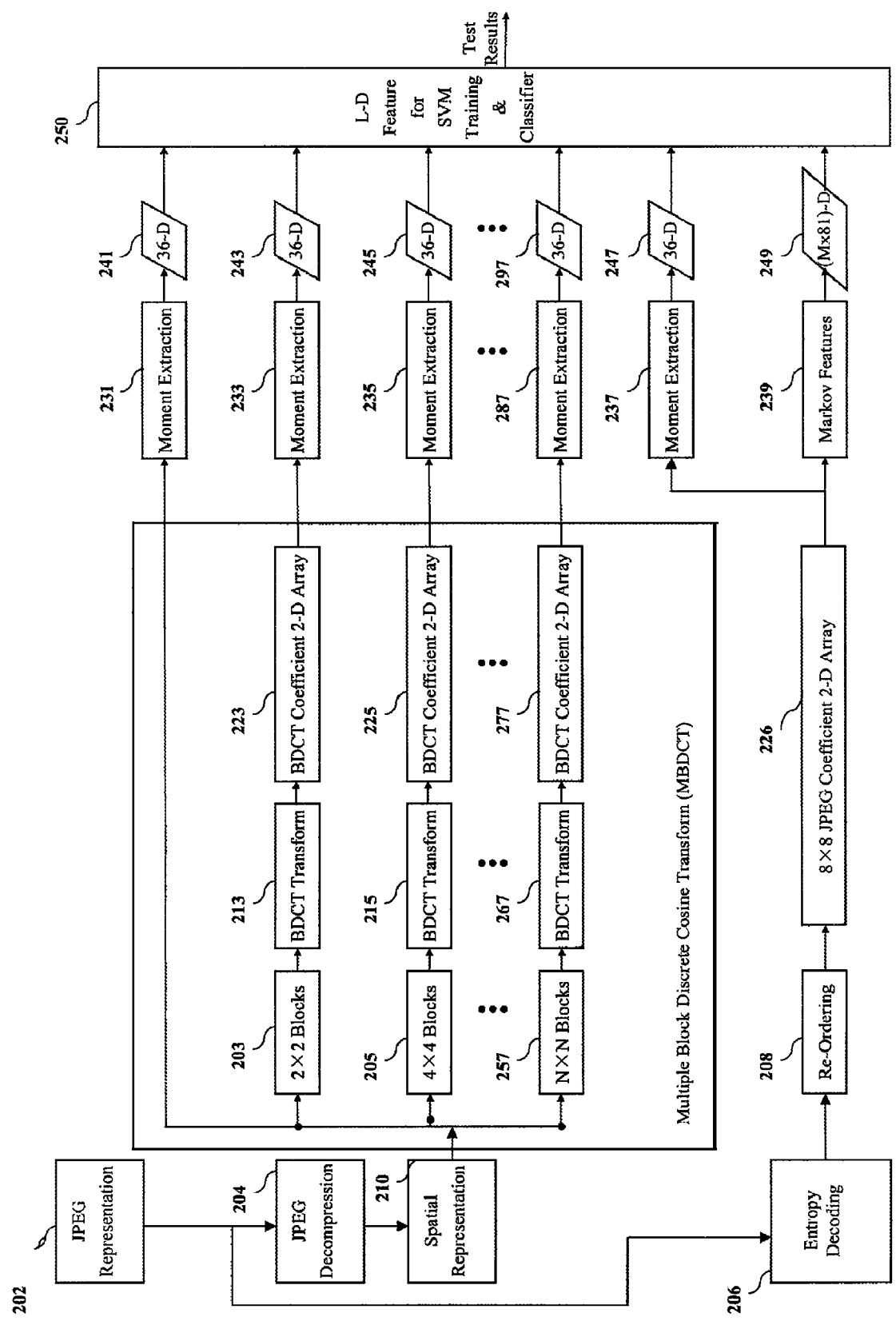
Figure 1B:
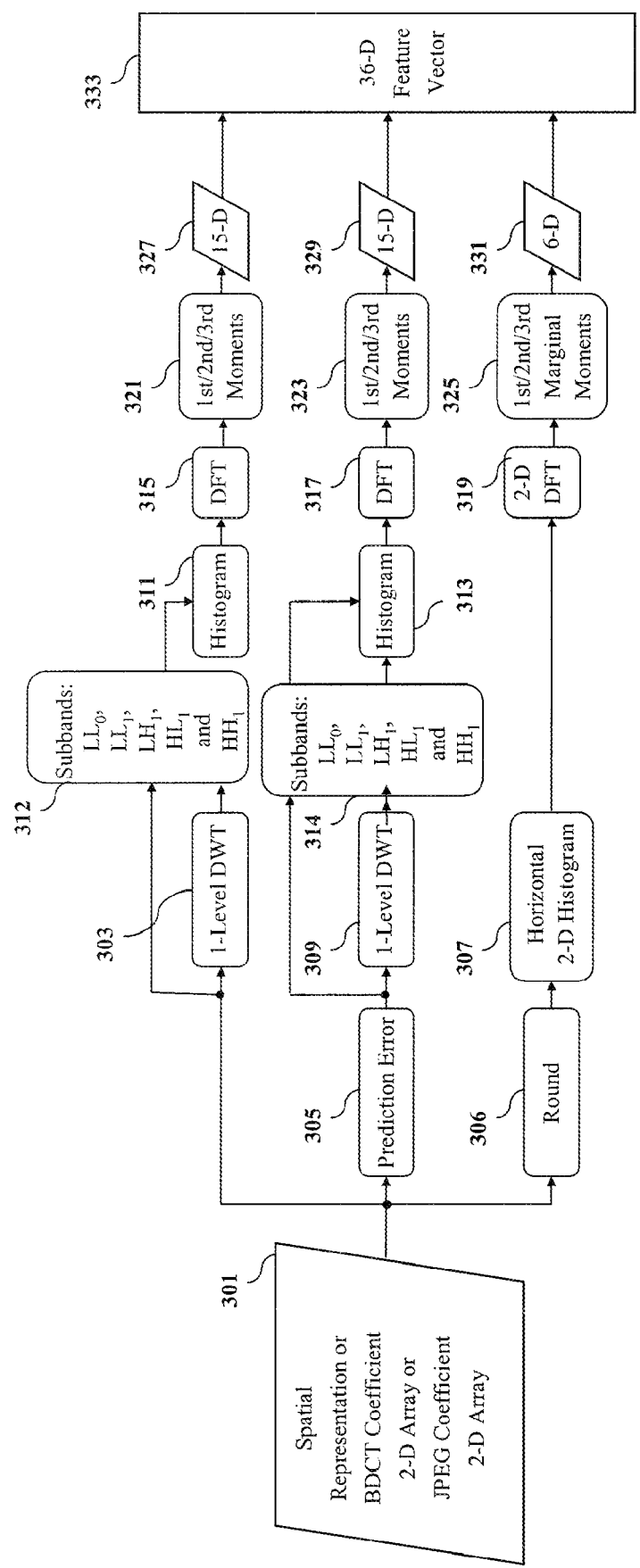
FIG. 1B is an exemplary block diagram of a 36-D moment feature vector generation.
Figures 1, 1C:
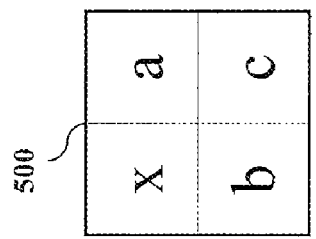
Figures 1, 1C, 2:
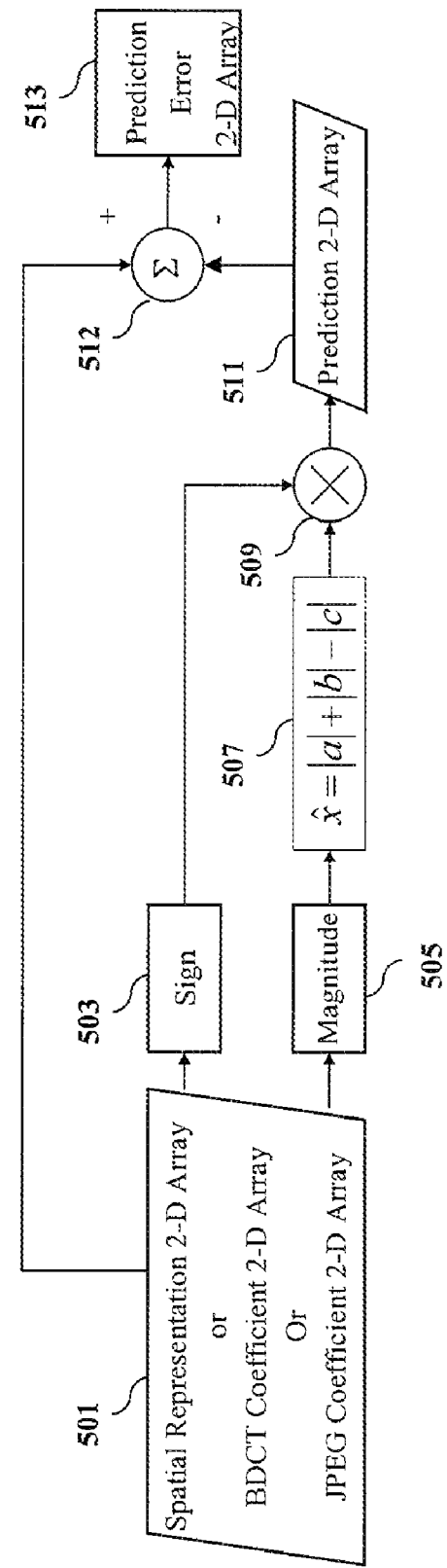
Figure 2A:
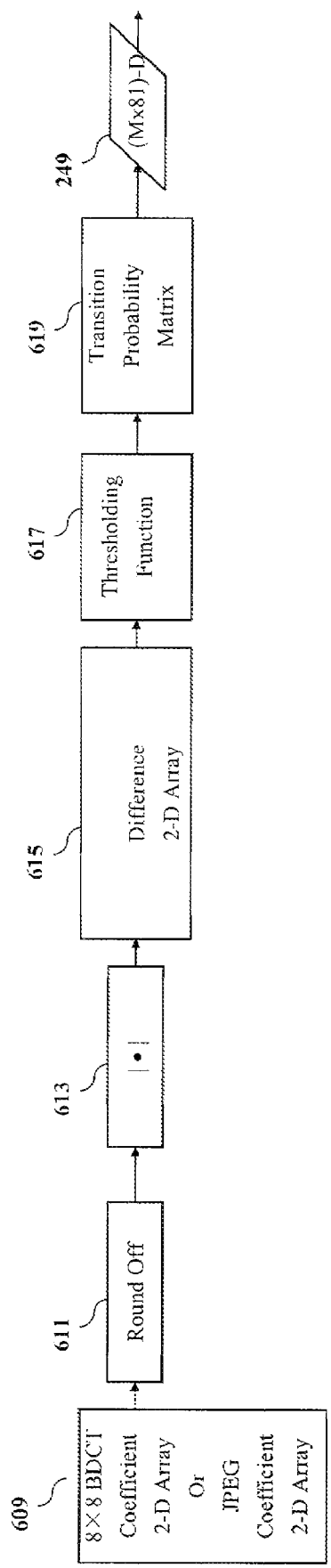
FIG. 2A is an exemplary block diagram showing the generation of Markov based M×81 features.
Figure 2B:
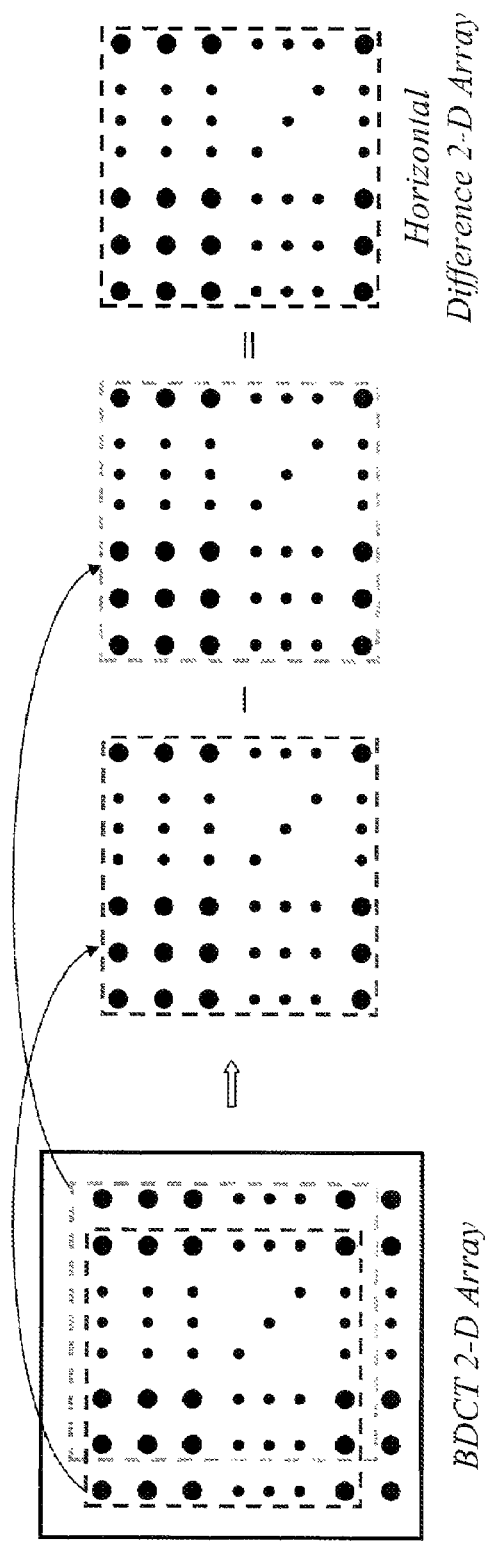
FIG. 2B is an exemplary flow diagram showing the generation of horizontal difference 2-D arrays.

FIG. 1A-1 to FIG. 2B are exemplary block diagrams of embodiments of a method for feature extraction. FIG. 1A-1 and FIG. 1A-2 are exemplary integrated block diagrams that include the moment extraction blocks and the transition probability extraction blocks. Additional details of exemplary moment extraction blocks are shown in FIG. 1B. FIG. 1C-2 is an exemplary block diagram of the generation of the prediction-error of the image/BDCT; FIG. 2A is an exemplary block diagram showing the generation of Markov based M×81 features; and FIG. 2B is an exemplary flow diagram showing the generation of horizontal difference 2-D arrays.

FIG. 1A-1 illustrates a block diagram of an exemplary method for the Feature Generation. In particular, FIG. 1A-1 shows a spatial representation 201 as an input to multiple N×N block decompositions 203, 205, 207, 257 of the suspect image data where N=2, 4, 8 and N. The N×N block decompositions of the image data are input to BDCT 213, 215, 217, 267. Computation of the BDCT results in BDCT coefficient 2-D arrays 223, 225, 227, 277.

The BDCT has been widely used in the international image and video compression standards due to its efficiency on decorrelation and energy compaction. For example, 8×8 BDCT has been adopted in JPEG and MPEG-2 (Moving Picture Experts Group) standards. The BDCT is used with a set of different block sizes in this novel natural image model for splicing detection. This is to utilize the comprehensive decorrelation capability of BDCT with various block sizes. The splicing procedure changes the local frequency distribution of the host images. With various block sizes, it is expected that this frequency change can be perceived by BDCT coefficients with different block sizes and hence the splicing operation can be detected with features extracted from these MBDCT 2-D arrays.

In embodiments of the invention, we choose the set of different block sizes N: as 2×2, 4×4, and 8×8 because this choice is of computational benefits in implementing DCT. Our experimental results on the image database below show that, when we include block size 16×16, the performance of the splicing analyzer does not improve much but the computational cost rises. This can be explained as the correlation between image pixels has become rather weak as the distance between pixels is too large. Also note that the image size in this database is only of size 128×128. That is, we have the spatial representation 2-D array, and three BDCT 2-D arrays for each given test image now, from each of which 36 moment features are generated.

Also, as shown in FIG. 1A-1, the spatial representation 201 and BDCT coefficient 2-D arrays 223, 225, 227, 277 each provide inputs for a Moment Extraction function 231, 233, 235, 237, 287. The outputs from the Moment Extraction function 231, 233, 235, 237, 287 are each ultimately 36-Dimensional (36-D) feature vectors 241, 243, 245, 247, 297.

The moment features are derived from the 1-D characteristic functions (DFT of the first-order histograms), as well as from the 2-D characteristic functions (DFT of second-order histograms. Statistical moments are effective, especially, the second-order histograms that involve two pixels at one time and hence bring out the second-order statistics, and thus improved performance in splicing/tampering detection.

Further, FIG. 1A-1 indicates a Markov Feature function 239. Outputs from the 8×8 BDCT Coefficient 2-D Array 227 are provided as an input to the Markov Feature function 239. The output of the Markov Feature function 239 provides an M×81-Dimensional (M×81-D) feature vector 249. Additional details of the Markov Feature function 239 are given below.

In particular, Markov features are effective to attack modern JPEG steganography. For JPEG images, Markov features are extracted from the JPEG coefficient 2-D array, which is the result of 8×8 BDCT followed by JPEG quantization. If a given test image is a raw image, there are no JPEG coefficients at all. Embodiments of the invention provide a splicing detection scheme that divides the spatial representation 2-D array into non-overlapping 8×8 blocks first, and then applies the Markov feature extraction procedure to the formulated 8×8 BDCT 2-D array.

Further, the Markov features are also derived from the 8×8 BDCT 2-D array of the given image. Features derived from Markov process along four directions may be used to enhance the steganalyzer's capability. However, features derived from one direction are used in an exemplary embodiment for splicing detection because of the limited number of images in the test image database.

As shown in FIG. 1A-1, each of the 36-D feature vectors and the M×81-D feature vector combine to form a final L-Dimensional (L-Dim.) feature vector that is input to the Support Vector Machine (SVM) trainer and classification function block 250. Alternatively, as discussed above, other set(s) of M×81-D features may be derived from other directions and used for splicing detection. An SVM is used in the trainer and classifier function 250, as shown in FIG. 1A-1. A non-limiting example of such a SVM is given in: C. J. C. Burges. "A tutorial on support vector machines for pattern recognition", Data Mining and Knowledge Discovery, 2(2): 121-167, 1998] The polynomial kernel with degree two is used in our investigation and downloaded from C. C. Chang, C. J. Lin, LIBSVM: A Library for Support Vector Machines.

The SVM 250 of FIG. 1A-1 is a kind of supervised machine learning method, which is widely used for pattern recognition applications. SVM can minimize the empirical classification error and while simultaneously maximize the geometric margin between two different classes. SVM codes in Matlab can provide the four basic kernels: linear, polynomial, radial basis function (RBF), and sigmoid. We use the RBF kernel in our reported experimental results.

In each experiment, randomly selected ⅚ of the authentic images and ⅚ of the spliced images are used to train a SVM classifier. Then the remaining ⅙ of the authentic images and ⅙ of the spliced images are used to test the trained classifier. The receiver operating characteristics (ROC) curve is obtained to demonstrate the detection performance.

FIG. 1A-2 illustrates another block diagram of an exemplary embodiment of the Feature Generation method of the invention for JPEG images. In particular, FIG. 1A-2 shows a JPEG representation 202 of the image data is provided as an input to both a JPEG decompression function 204 and Entropy Decoding function 206. The output of the JPEG decompression function 204 is provided as an input to a reconstruction function that reconstructs a spatial representation 210 of the image from the JPEG decompression. The spatial representation 210 of the image is provided as an input to the Moment Extraction function 231 and multiple, non-overlapping N×N block size decompositions 203, 205, 257 of the suspect image data, where N=2, 4, and N, where the 8×8 coefficients are provided by the JPEG Coefficient 2-D Array 226. The output of the Entropy Decoding function 206 is re-ordered by the Re-ordering function 208 and the re-ordered output is provided to the 8×8 JPEG coefficient 2-D Array 226. The Re-ordering function 208 is further discussed below.

The N×N block decompositions of the image data are input to BDCT functions 213, 215, 267. The outputs of the BDCTs 213, 215, 267 provide inputs for BDCT coefficient 2-D arrays 223, 225, 277. The JPEG Quantized coefficient 2-D array 226 and BDCT coefficient 2-D arrays 223, 225, 277 are each provide as inputs for Moment Extraction functions 233, 235, 287. The outputs from the Moment Extraction function 231, 233, 235, 287, 237 are each ultimately 36-D feature vectors 241, 243, 245, 297, 247 and the output of the Markov Feature function 239 is an M×81-Dimensional feature vector 249, each of which forms a part of a final L-Dimensional (L-D) feature vector that is input to a Support Vector Machine (SVM) trainer and classifier 250.

With regards to the decompression function 204 of FIG. 1A-2, the procedures for JPEG compression is described in the following paragraph. A given image is first partitioned into a set of non-overlapping 8×8 blocks. The 2-D BDCT is applied to each of these 8×8 blocks independently, resulting in 64 block DCT (BDCT) coefficients for each block. After thresholding and shifting, these BDCT coefficients are quantized with one of the JPEG quantization tables, resulting in integer valued BDCT coefficients. These quantized BDCT coefficients are then zigzag scanned within each 8×8 block so that the BDCT coefficients within each block become a 1-D sequence of integers. Since the quantization causes a large number of BDCT coefficients to become zero, the run-length coding becomes efficient in coding the positions of these non-zero coefficients. The run-length codes and those non-zero coefficients' magnitudes are entropy coded (e.g., often either Huffman code or arithmetic code), thus forming one JPEG file for the JPEG compressed image.

The JPEG decompression is a reverse process of the JPEG compression function discussed above. Hence, to form a 2-D array consisting of all of the JPEG quantized BDCT coefficients from all of the 8×8 blocks, as shown in FIG. 1A-2 entropy decoding 206 needs to be applied so that we can obtain the non-zero coefficients' positions and magnitudes. Then, as shown in FIG. 1A-2, a re-ordering function 208 needs to be applied so that we can recover the 64 JPEG quantized BDCT coefficients' original locations within each 8×8 block. Specifically, a 1-D zigzag scanning re-ordering returns the coefficients back to the original ordering in the 8×8 block. The recovered JPEG coefficients from each block are then used in forming the 2-D array of JPEG coefficient 2-D array 226.

FIG. 1B illustrates a block diagram of an exemplary method for Moment Extraction of the Feature Generation method shown in FIG. 1A (231, 233, 235, 237, 239). As shown in FIG. 1B, two-dimensional arrays 301 of at least one of an image pixel 2-D array and BDCT coefficient 2-D arrays are provided as inputs to at least a 1-level discrete wavelet transform (DWT) 303, a Subband Processing function 312, a Prediction Error Function 305 and a Rounding Function 306. The Subband Processing function 312 produces subbands used in further processing. The output of the Prediction Error Function 305 is further processed by at least a 1-level DWT 309 and a Subband Processing function 314. The output of the Round Function 306 provides the input to a horizontal 2-D histogram function 307. Histogram functions 311, 313 are computed for each of the Subband Processing function 312, 314. These histogram functions 311, 313 outputs, as well as the horizontal 2-D histogram function 307 output provide input data to discrete Fourier Transform (DFT) function blocks 315, 317 and two-Dimensional DFT function block 319. First/Second/Third Moment function blocks 321, 323 are applied to the computed DFT function 315, 317. First/Second/Third Marginal Moment function block 325 is applied to a 2-D DFT function 319 output of the 2-D histogram function 307. The Moment functions 321, 323 and Marginal Moment function 325 result in the 15-dimensional (15-D) feature components 327, 329 and the 6-dimensional (6-D) feature component 331, respectively, of the 36-Dimensional (36-D) feature vectors 241, 243, 245, 247, as shown in FIG. 1A.

FIG. 1C-1 illustrates an exemplary embodiment of a prediction context for the Prediction Error function 305 of FIG. 1A. That is, in accordance with the prediction context, the method predicts the value of x using the values of its neighbors a, b, and c.

FIG. 1C-2 illustrates a more detailed block diagram of an exemplary embodiment of the Prediction Error function 305 of FIG. 1A. In addition, the prediction formula is given by Equation (6). As shown in FIG. 1C-2, 2-D arrays 501 of at least one of spatial representation, BDCT coefficients and JPEG coefficients are provided as inputs to both a sign determining function block 503 and a magnitude determining function block 505. The magnitude determining function block 505 provides input to a mathematical block 507 that calculates the mathematical expression: |a|+|b|−|c|. A multiplier 509 computes the product of the output of the sign determining block 503 and the mathematical block 505. The results from the multiplier 509 are then fed to a 2-D Prediction array block 511. The prediction error is then determined by the difference function 512 that computes the difference between at least one of a spatial representation/image/BDCT coefficient 2-D arrays/JPEG coefficient 2-D arrays 501 and the Prediction 2-D array 511.

Considering the high dimensionality of the features leads to high computational complexity, we compute at least a one-level (1-level) discrete wavelet transform (DWT) in an exemplary embodiment of the invention. If we consider the spatial representation of the image, the BDCT coefficient 2-D array, or the JPEG coefficient 2-D array as $LL_0$, we have five subbands for a 1-level DWT decomposition. As compared to a 3-level DWT decomposition, the feature dimensionality of a 1-level DWT is reduced to 38%. The wavelet transform for this embodiment can be, but is not limited to the Haar wavelet transform, which is the simplest wavelet.

The feature vectors used in embodiments of the invention with methods for splicing detection include, but are not limited to: 225-dimensional (225-D). The first 36 features are derived from the given image. These 36 features can be divided into three groups. The first group has 15 features, which consist of moments from the 1-D CF's of the given image and its 1-level Haar wavelet subbands. The second group also has 15 features, which consist of moments generated from the 1-D CF's of the prediction-error image and its 1-level Haar wavelet subbands. The third group has 6 features, which consist of marginal moments from the 2-D CF of the given image. This method is shown in FIG. 1B.

As described above, the 1-D CF function is the DFT of the 1-D histogram of each subband. Embodiments of the method are based on the moments of the characteristic function (i.e., the Fourier transform of the histogram) of an image. Given $H(x_i)$, which is the CF component at frequency $x_i$, and K, which is the total number of different value level of coefficients in a subband under consideration, the absolute moments are defined as follows:

$$M_n = \frac{\sum_{i=1}^{K/2} x_i^n |H(x_i)|}{\sum_{i=1}^{K/2} |H(x_i)|}, \tag{1}$$

An exemplary block diagram of a method for prediction is shown in FIG. 1C-2. Starting from the prediction context, as shown in FIG. 1C-1, we need to predict the value of x using the values of its neighbors a, b, and c. The prediction formula is given by Equation (2). The prediction-error is the difference between an image and its prediction.

$$\hat{x} = \text{sign}(x) \cdot \{|a| + |b| - |c|\}. \tag{2}$$

The second-order histogram is a measure of the joint occurrence of pairs of pixels separated by a specified distance and orientation. Denote the distance by ρ and the angle with respect to the horizontal axis by θ. The second-order histogram is defined in Equation (3) as:

$$h_d(j_1, j_2; \rho, \theta) = \frac{N(j_1, j_2; \rho, \theta)}{N_T(\rho, \theta)} \tag{3}$$

where $N(j_1, j_2; \rho, \theta)$ is the number of pixel pairs for which the first pixel value is $j_1$ while the second pixel value is $j_2$, and $N_T(\rho, \theta)$ is the total number of pixel pairs in the image with separation $(\rho, \theta)$. The second-order histogram is also called dependency matrix or co-occurrence matrix.

The integrated block diagram of an implementation of the method for feature extraction is shown in FIG. 1A. In particular, FIG. 1A is an exemplary Integrated block diagram; FIG. 1B is an exemplary block diagram of a 36-D moment feature vector generation; FIG. 1C is an exemplary block diagram of a prediction-error 2-D array generation; and FIG. 2A is an exemplary block diagram of a 81-D transition probability feature vector generation. For the given image, we generate a second-order histogram with separation $(\rho, \theta) = (1,0)$, which is called horizontal 2-D histogram. After applying the 2-D DFT 319 to the 2-D histograms 307, the marginal moments of 2-D CF's are calculated in Equation (4) as:

$$M_{u,n} = \frac{\sum_{j=1}^{K/2}\sum_{i=1}^{K/2} u_i^n |H(u_i, v_j)|}{\sum_{j=1}^{K/2}\sum_{i=1}^{K/2} |H(u_i, v_j)|}, \quad M_{v,n} = \frac{\sum_{j=1}^{K/2}\sum_{i=1}^{K/2} v_j^n |H(u_i, v_j)|}{\sum_{j=1}^{K/2}\sum_{i=1}^{K/2} |H(u_i, v_j)|}, \tag{4}$$

where $H(u_i, v_j)$ is the 2-D CF component at frequency $(u_i, v_j)$ and K is the total number of different values of coefficients in a wavelet subband under consideration.

In FIG. 1A, features 241, 243, 245 are generated from the block discrete cosine transform (BDCT) of the given image. The procedure of BDCT is described as follows. First, the given image is divided into N×N non-overlapping blocks. Then, the two-dimensional (2-D) discrete cosine transform (DCT) is applied to each block independently. Denoting a formed image block by $f(x,y)$, $x,y=0,1,\ldots,N-1$, the DCT coefficient in a block is given by:

$$F(u, v) = \frac{2}{N} \sum_{x=0}^{N-1} \sum_{y=0}^{N-1} \Lambda(x)\Lambda(y)\cos\frac{\pi u(2x+1)}{2N}\cos\frac{\pi v(2y+1)}{2N} f(x, y), \quad (5)$$

$$u, v = 0, 1, \ldots N-1,$$

where $$\Lambda(x) = \begin{cases} \frac{1}{\sqrt{2}}, & x = 0 \\ 1, & \text{otherwise} \end{cases} \quad (6)$$

With block size N×N, where N is equal to 2, 4, and 8, are chosen accordingly.

After the BDCT, we have a BDCT coefficient 2-D array, which consists of the BDCT coefficients and has the same size as the image. As noted above, we choose block size N equal to 2, 4, and 8, respectively. Three different BDCT coefficient 2-D arrays are consequently obtained. We apply the same method for moment extraction on these three arrays to calculate a 108-dimensional (108-D) feature vector.

FIG. 2A shows how the last 81 features are derived from the 8×8 BDCT 2-D array of the given image. The 8×8 BDCT coefficients are obtained by: (1) rounding to the nearest integer values; (2) taking the absolute values of these integers values; and (3) obtaining the horizontal difference 2-D array $F_h(u,v)$ by applying the following formula in Equation (7), as:

$$F_h(u, v) = F(u, v) - F(u+1, v) \quad (7)$$

where $u \in [0, S_u-2]$, $v \in [0, S_v-2]$, $F(u, v)$ is the absolute BDCT coefficient, and $S_u$, $S_v$ denote the image resolution in the horizontal direction and vertical direction, respectively. The formation of the horizontal difference 2-D array (horizontal difference array in short) is shown in FIG. 2A. It is to be understood that difference arrays obtained with different directions form the horizontal direction are possibly used.

In embodiments of the invention, a model of the above-defined difference array is developed by using Markov random process. According to the theory of random process, the transition probability matrix can be used to characterize the Markov process. The methods of the invention use the one-step transition probability matrix. In order to reduce computational complexity further, the methods use a thresholding technique. A threshold is chosen as, for example, but not limited to: T=4 in one embodiment. That is, if the value of an element in the horizontal difference array is either larger than 4 or smaller than −4, and will be represented by 4 or −4, respectively. Using these methods result in a transition probability matrix of dimensionality 9×9=81. The elements of the matrix associated with the horizontal difference array, which are used as feature vectors, are given in Equation (8), as:

$$p\{F_h(u+1, v) = n \mid F_h(u, v) = m\} = \quad (8)$$

$$\frac{\sum_{v=0}^{S_v-2} \sum_{u=0}^{S_u-2} \delta(F_h(u, v) = m, F_h(u+1, v) = n)}{\sum_{v=0}^{S_v-2} \sum_{u=0}^{S_u-2} \delta(F_h(u, v) = m)}$$

where $m \in \{-4, -3, \ldots, 0, \ldots, 4\}$, $n \in \{-4, -3, \ldots, 0, \ldots, 4\}$, and Equation (9) is given as:

$$\delta(A = m, B = n) = \begin{cases} 1, & \text{if}: A = m, B = n \\ 0: & \text{Otherwise.} \end{cases} \quad (9)$$

Embodiments of the invention using a natural image model approach to splicing/tampering detection are to provide splicing detection on the image dataset.

Note that all elements of the transition probability matrix are used as features for splicing detection. The generation of Markov features used in the exemplary block diagram shown in FIG. 2A. In FIG. 2A, the 8×8 BDCT Coefficient 2-D array 609 provides inputs to the Rounding function 611. The outputs of the Rounding function 609 are provided to the product function 613. The outputs of the product function are provided to the Horizontal Difference 2-D array 615. Outputs from the Horizontal Difference 2-D Array 615 are provided to the Thresholding function 617. The Thresholding function provides inputs to the Transition Probability Matrix 619. Outputs of the Transition Probability Matrix 619 are provided to the M×81-Dimensional feature vector 249.

FIG. 2B shows the horizontal difference 2-D array formation. As indicated in the FIG. 2B, the 8×8 BCDCT 2-D Array (with rounded magnitude) is used and a difference 2-D array is formulated by subtracting from this an 8×8 BDCT 2-D array that has been shifted toward the right hand side by one position which results in the horizontal difference 2-D Array.

Figure 4A:
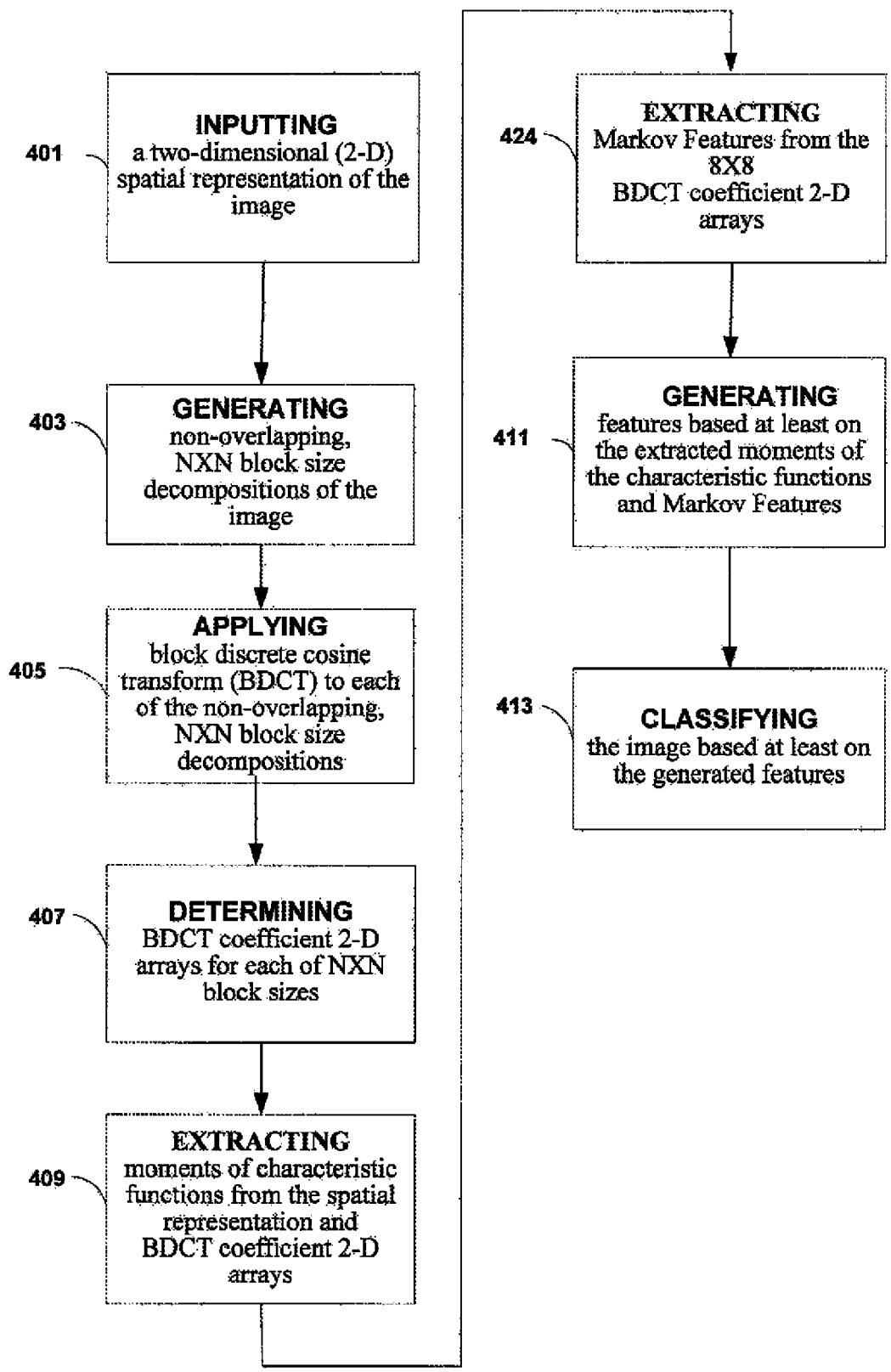
FIG. 4A is an exemplary flow diagram of a method for image splicing/tampering detection.

FIG. 4A is a flow diagram of an exemplary embodiment of a method for steganalysis of a spatial representation of an image. In Step 401 of FIG. 4A, a two-dimensional (2-D) spatial representation of the image is given as an input to the method. Step 403 involves generating non-overlapping N×N block decompositions of the image. Applying a block discrete cosine transform (BDCT) to each of the non-overlapping N×N block decompositions is performed in Step 405. In Step 407, BDCT coefficient 2-D arrays for each of N×N block coefficients are determined. Step 409 involves extracting moments of a characteristic function from the spatial representation of the image and each of the BDCT coefficient 2-D array 223, 225, 227, 277. Step 424 involves extracting Markov Process features from the 8×8 BDCT coefficient 2-D array 227. Generating features based at least on the extracted moments of the characteristic function occurs in blocks 231, 233, 235, 237, 239 at Step 411. In Step 413, classifying the image based at least on the generated features occurs. Moreover, in Step 413, we randomly select ⅚ of the cover/stego image pairs to train the SVM classifier and the remaining ⅙ pairs to test the trained classifier. In implementing the flow diagram of FIG. 4A, a given spatial representation of an image is divided into non-overlapping N×N blocks.

Figure 4B:
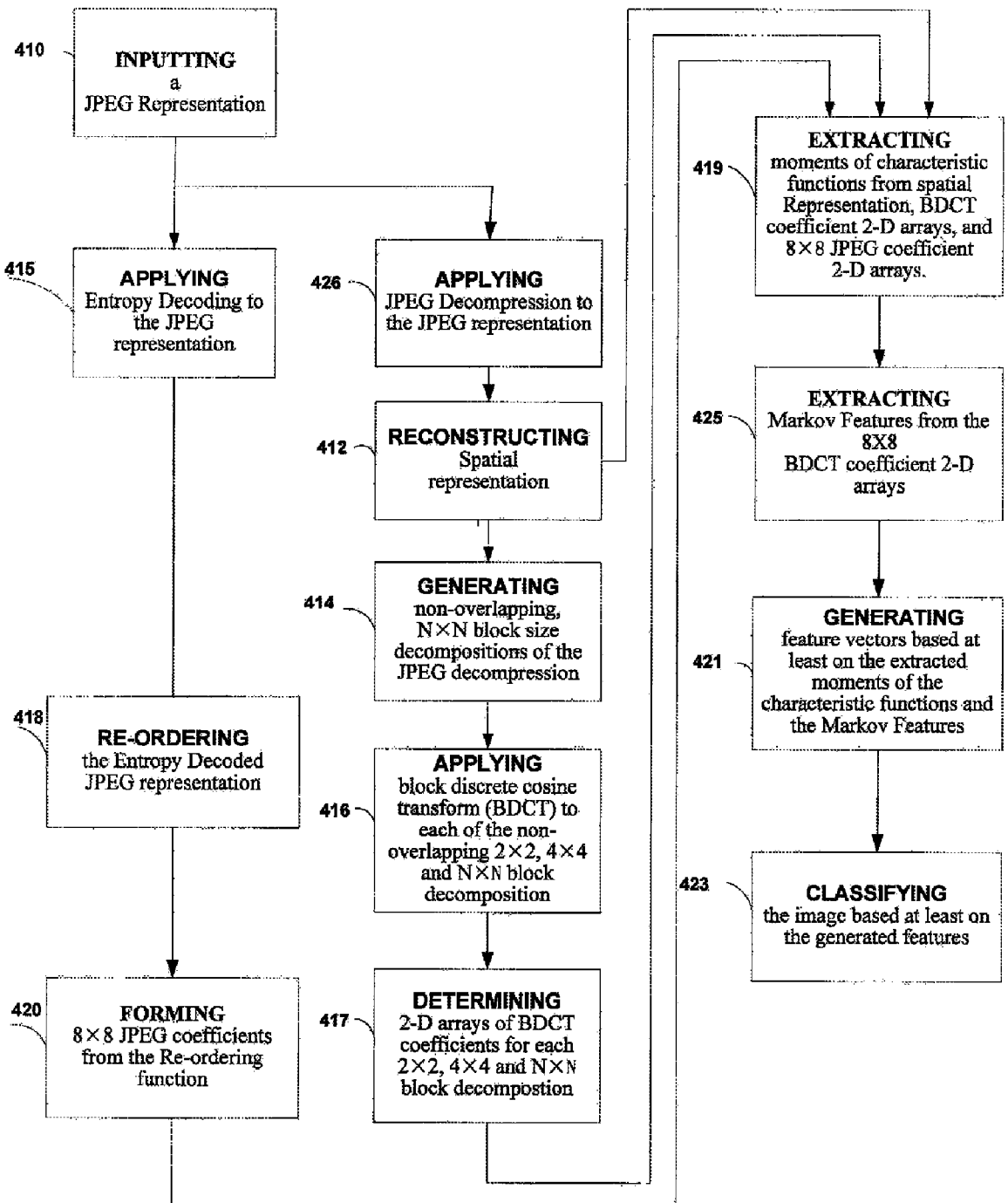
FIG. 4B is an exemplary flow diagram of a method for image splicing/tampering detection for an image with a JPEG representation.

FIG. 4B is a flow diagram of an exemplary embodiment of a method for steganalysis of a JPEG representation of an image. In Step 424 of FIG. 4B, a JPEG representation of an image is given as an input to the method. Applying a JPEG Decompression to the JPEG representation occurs in Step 426. Step 412 is the reconstruction of a spatial representation of the image from the JPEG Decompression. Step 414 involves generating non-overlapping N×N block decompositions of the image, where N=2, 4 and 16. Step 415 involves applying Entropy Decoding to the JPEG representation. Applying a block discrete cosine transform (BDCT) to each of the non-overlapping N×N block decompositions is performed in Step 416. In Step 417, 2-D arrays of coefficients for each BDCT of N×N blocks are determined. Step 418 is the re-ordering of the entropy decoded JPEG representation. In Step 420, the 8×8 JPEG coefficients for each 8×8 2-D array are formed from the Entropy Decoding 206. Step 419 involves extracting moments of a characteristic function from the spatial representation 210 of the image, BDCT coefficient 2-D arrays 223, 225, 277 and the JPEG coefficient 8×8 2-D array 226. Step 425 involves extracting Markov Process features from the JPEG coefficient 2-D array 226. Generating features based at least on the extracted moments of the characteristic function occurs in blocks 231, 233, 235, 237, 287 in Step 421. In Step 423, training and classifying the image based at least on the generated features occurs. Moreover, in Step 423, we randomly select 5/6 of the cover/stego image pairs to train the SVM classifier and the remaining 1/6 pairs to test the trained classifier.

In implementing the flow diagram of FIG. 4B, a given JPEG representation of an image is divided into non-overlapping N×N blocks. The two-dimensional (2-D) discrete cosine transform (DCT) is applied to each block independently. Denoting a formed image block by f(x,y), x,y=0, 1, ..., N−1, the 2-D BDCT coefficient is given by: Equation (3), as discussed above. N×N block sizes are used, where N is equal to 2, 4, and 8, are chosen accordingly.

While embodiments of the invention can be different from case to case according to the actual application situation, the main idea behind the implementation remains the same. Though the above discusses one embodiment of the invention, some possible variations on implementations are summarized in the paragraphs below.

Preferably, not only a test image but also the associated 2-D arrays, generated by applying to the test image the block discrete cosine transform (BDCT) with variable block sizes are utilized for generating features for splicing/tampering detection. The block size can be 2×2, 4×4, 8×8, 16×16, 32×32, depending on the specific application.

Preferably, not only the above-mentioned test image and the associated 2-D arrays but also their respective prediction-error 2-D arrays (i.e., a digital image is also a 2-D array) are used for generating features for splicing/tampering detection. One of the prediction methods is described in Equation 3. Other types of prediction methods that may be used include, but are not limited to the prediction methods used in Y. Q. Shi, G. Xuan, D. Zou, J. Gao, C. Yang, Z. Zhang, P. Chai, W. Chen, and C. Chen, "Steganalysis based on moments of characteristic functions using wavelet decomposition, prediction-error image, and neural network", IEEE International Conference on Multimedia & Expo 2005, Amsterdam, Netherlands, July, 2005.

Preferably, for the 2-D arrays (i.e., image, or BDCT 2-D array, or prediction-error image, or prediction-error BDCT 2-D array), wavelet decomposition is carried out. All subbands, including the LL subbands are used to generate statistical features. In addition, preferably, not only Haar wavelet transform but also other wavelet discrete wavelet transforms are applicable.

Preferably, the 2-D arrays, described above can be denoted by the $LL_0$. Statistical moments are generated from all of the $LL_0$ subbands as well. In addition, instead of generating statistical moments directly from the subbands, the moments may be generated from characteristic functions of these subbands.

Preferably, the 2-D histogram is generated from the rounded 2-D array. In addition, the separation of second-order histogram: we use $(\rho,\theta)=(1,0)$ in this implementation. Other separations of four second-order histograms (also referred to as 2-D histograms) are generated with the following four possible separations:

$$(\rho, \theta) = \left\{(1, 0), \left(1, -\frac{\pi}{2}\right), \left(1, -\frac{\pi}{4}\right), \left(1, \frac{\pi}{4}\right)\right\},$$

with the parameters $\rho$ representing the distance between the pair of elements for which the two-dimensional histogram is considered, and $\theta$ representing the angle of the line linking these two elements with respect to the horizontal direction; which are called horizontal 2-D histogram, vertical 2-D histogram, diagonal 2-D histogram, and minor diagonal 2-D histogram, respectively.

Preferably, the 2-D characteristic function is generated by applying discrete Fourier transform (DFT) to 2-D histogram. Some marginal moments are generated as features. In addition, preferably absolute moments as defined in Equations (1) and (4) are generated. Further, although only the first three order moments are used in our implementation, using more than the first three order moments is possible if it brings advantage in application and if the computational complexity manageable.

Preferably, the difference 2-D array is generated from a 2-D array after the rounding operation and the operation of taking absolute value (magnitude) have been applied to the 2-D array. In addition, although only the horizontal difference 2-D array is used in this implementation, other choices such as vertical, main-diagonal, and minor-diagonal difference 2-D arrays can also be used. Or, more than one type difference 2-D arrays are used in one implementation for some applications. Further, preferably, for difference 2-D array, the Markov process is applied.

Preferably, although one-step Markov process is applied in the implement horizontally, the other directions are feasible, e.g., vertically, main-diagonally, and minor-diagonally. In addition, two-step and three-step Markov processes may be applied for some applications. Further, the probability transition matrix is formed to characterize the Markov process.

Preferably, a thresholding technique is used to reduce the dimensionality of the matrix. Further, although the threshold T used in this implementation is selected as T=4 according to a statistical analysis similar to that reported in Y. Q. Shi, C. Chen, and W. Chen, "A Markov process based approach to effective attacking JPEG steganography", Information Hiding Workshop 2006, Old Town Alexandria, Va., USA, Jul. 10-12, 2006, different threshold T values may be considered. This may improve the detection rate for splicing/tampering detection. However, doing so will result in larger feature dimensionality and thus more computational cost, in particular, in the classifier's training stage. For example, if we use T=5 instead of T=4 in forming probability transition matrix to characterize Markov process in this implementation, the Markov process based feature dimensionality will be 121 instead of 81. Moreover, larger dimensionality needs larger image dataset. In our experiment results given below, we have only 1845 images in the image dataset. Therefore, we use T=4 in this reported implementation.

Preferably, all entries in the truncated transition probability matrix are used as part of features. Further, with respect to classification, the support vector machine (SVM) is used in this work as classifier, which has four basic kernels: linear, polynomial, radial basis function (RBF), and sigmoid. In addition, the RBF kernel is used.

In the above discussion, it is assumed that the input test image is in general format, say, the bitmap (BMP). If the input test image is given in JPEG format, then the 8×8 BDCT is not required to apply to each of the non-overlapping 8×8 blocks to generate an 8×8 BDCT 2-D array. Instead, the procedure can directly work on the so-called JPEG 2-D array (i.e., the JPEG file is decoded to have all of the quantized 8×8 block DCT coefficients available. Then, these coefficients in the same arrangement as when the JPEG compression is carried out are used to form a 2-D array, whose size is the same as the original image size.) To generate the BDCT 2-D arrays with other block sizes, such as 2×2, 4×4, and 16×16, we first decompress the JPEG file into an image in spatial domain, then apply the BDCT with these block size to generate these 2-D arrays.

The image dataset used to produce our experimental results is the Columbia Image Splicing Detection Evaluation Dataset is by courtesy of DVMM, Columbia University. This data set is created by DVMM, Columbia University for benchmarking the blind passive image splicing detection algorithms. Content diversity, source diversity, balanced distribution, and realistic operation are emphasized while this image data set is created. There are five image block types for the authentic and the spliced classes in this data set, i.e., image with an entirely homogeneous textured region, image with an entirely homogeneous smooth region, image with an object boundary between a textured region and a smooth region, image with an object boundary between two textured regions, and image with an object boundary between two smooth regions, respectively. Two kinds of splicing techniques are used: arbitrary-object-shaped splicing and straight line splicing. Moreover, to ensure that sufficiently accurate statistical data can be extracted from each image, all these images are provided of the same size 128×128. It is a data set open for downloading. There are 933 authentic and 912 spliced images in this data set.

To evaluate the effectiveness of our proposed scheme, we generate a 225-D feature vector using the implementation of feature extraction described above for each authentic and each spliced image. In each experiment, randomly selected 5/6 of the authentic images and 5/6 of the spliced images are used to train a SVM classifier. Then the remaining 1/6 of the authentic images and 1/6 of the spliced images are used to test the trained classifier.

Figure 3:
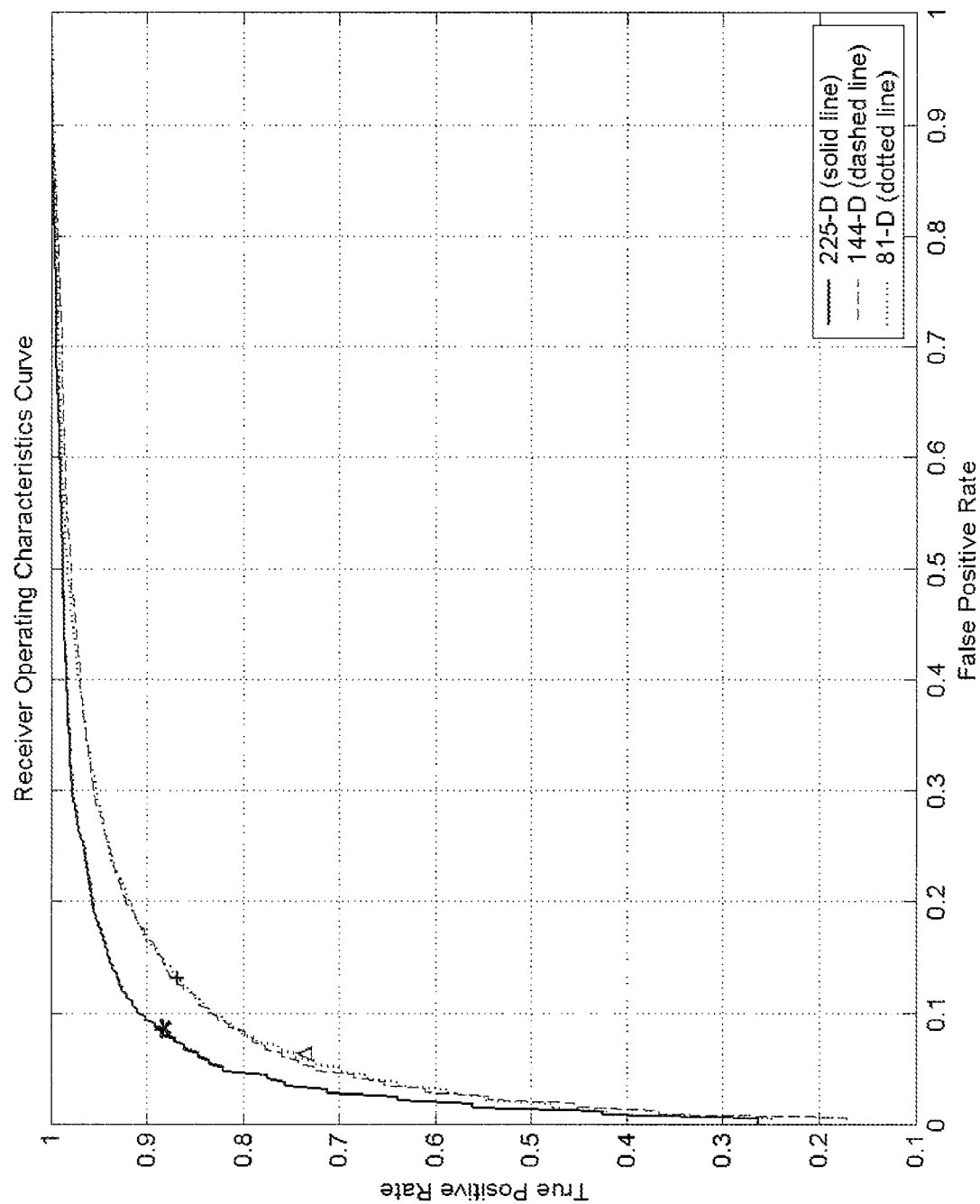
FIG. 3 is a Receiver Operating Characteristic for the detection performance.

FIG. 3 shows the receiver operating characteristics (ROC) curve, as shown in FIG. 3, is obtained to demonstrate the performance of a trained classifier. Two numerical methods can also be used to show the classifier's performance. One method is to calculate the area under the ROC curve (AUC). Another method is to obtain detection rates, i.e., true negative (TN) rate, true positive (TP) rate, and accuracy of the trained classifier. To eliminate the effect of randomness incurred by image selection, we individually conduct each random experiment 20 times. Results reported below are the arithmetic average of these 20 independent random tests.

The receiver operating characteristic (ROC) curve for embodiments of the invention is shown in FIG. 3, which is the arithmetic average of 20 random experiments. The area under the ROC curve (AUC) is 0.9541. In addition, the embodiments of the invention can also obtain the true negative rate, the true positive rate, and the accuracy, which are 91.45%, 92.57%, and 92.00%, respectively. Compared with the background art referenced above, embodiments of the invention achieved a detection accuracy of 92%. Thus, embodiments of the invention have achieved a significant advancement in splicing detection. The averaged ROC curve of experiments using our proposed scheme is given in FIG. 3 (the curve in FIG. 3 that is marked with an asterisk).

The averaged detection rates and AUC are also given in Table 1. Compared to the background art, which achieve a detection accuracy of 72%, 80%, and 82%, respectively, the implementation of the proposed approach has made a significant advancement in splicing detection.

TABLE 1

Experimental results using proposed scheme (standard deviation in parentheses)

| Feature | Proposed scheme |
| --- | --- |
| TN rate | 91.45% (2.35%) |
| TP rate | 92.57% (1.57%) |
| Accurac | 92.00% (1.08%) |
| AUC | 0.9541 (0.0091) |

In addition, experimental results with reduced feature space were tested. That is, we also implemented experiments with reduced dimensionality of feature vectors in order to examine the contributions made by moment features and Markov features independently. The results are shown in FIG. 3 and Table 2. In FIG. 3, the 144-D curve, which is marked with a '+', corresponds to moment features and the 81-D curve, which is marked with a 'Δ', corresponds to Markov features.

It can be seen from FIG. 3 that the contribution from the moment features is comparable to that from the Markov features. Independently applied, each of these two feature sets has outperformed the background art. Comparing Table 1 and Table 2, we can observe that combining these two feature sets has further enhanced the splicing detection rate.

TABLE 2

Detection rate with reduced feature space (standard deviation in parentheses)

| Feature | 144-D moment features | 81-D Markov features |
| --- | --- | --- |
| TN rate | 86.58% (2.84%) | 87.03% (2.12%) |
| TP rate | 88.72% (2.67%) | 88.13% (2.33%) |
| Accurac | 87.64% (2.11%) | 87.57% (1.28%) |
| AUC | 0.9338 (0.0126) | 0.9330 (0.0111) |

An additional feature of embodiments of the invention is the demonstration of the effect of Mult-size BDCT (MB-DCT), which we call the "rake transform." Features are derived from statistical moments are of dimensionality 144-D. The first 36 feature components are derived from the spatial representation. The second, third, and fourth are derived from BDCT representation with block size 2×2, 4×4, and 8×8, respectively. Experimental results using part of and all of these features are given in Table 3. In this table, "36-D" means only the first 36 feature components (from the spatial representation) are used, "72-D" means the first and the second 36 feature components (from the 2×2 BDCT) are used, and so on.

The MBDCT is powerful in modeling images. It functions like rake receivers widely used in wireless communications, where each reflected signal contributes to the rake receiver to improve the SNR (signal to noise ratio) of the received signal. Here, each block DCT 2-D array with a block size contributes to splicing detection. Collectively, the MBDCT raises capability of splicing detection greatly.

It is observed from these results that each of the BDCT's makes a contribution to the splicing analyzer. Moreover, the more the BDCT (up to 8×8) are included, the better the detection performance.

TABLE 3

Detection rate with reduced feature space (standard deviation in parentheses)

| Feature set | 36-D | 72-D | 108-D | 144-D |
|---|---|---|---|---|
| TN rate | 74.32% | 77.45% | 82.71% | 86.58% |
| TP rate | 73.32% | 77.73% | 82.76% | 88.72% |
| Accurac | 73.83% | 77.59% | 82.74% | 87.64% |
| AUC | 0.7928 | 0.8450 | 0.8888 | 0.9338 |

The choice of block size in Multi-size BDCT is further explored in the following. The features of statistical moments are derived from the image pixel 2-D array, and the MBDCT 2-D arrays. Specifically, in the implementation of MBDCT, we only use block sizes: 2×2, 4×4, and 8×8. In the experimental results given in Table 4, a performance comparison of current implementation (i.e., 225-D features) with an implementation including 16×16 BDCT (thus 261-D features) is made. From Table 4 we can see that the performance of the splicing analyzer is not enhanced with features derived from 16×16 BDCT, although the feature size has increased.

TABLE 4

Performance comparison: with vs. without 16 × 16 BDCT (standard deviation in parentheses)

| Feature set | 225-D features | 261-D features |
|---|---|---|
| TN rate | 91.45% (2.35%) | 90.58% (2.33%) |
| TP rate | 92.57% (1.57%) | 92.04% (1.73%) |
| Accurac | 92.00% (1.08%) | 91.30% (1.33%) |
| AUC | 0.9541 (0.0091) | 0.9550 (0.0092) |

The choice of the threshold T is further explored in the following. In particular, the choice of the threshold T is used to reduce the Markov features' dimensionality. To select an appropriate T, the following points should be taken into consideration. The T cannot be too small. With a too small T, some information of the elements of the transition probability matrix will be lost. On the other hand, T cannot be too large. With a too large T, the existence of T is meaningless.

In Table 5, we give the performances of Markov features with three different T. i.e., T=3, 4, and 5, respectively. From this table, we can see that the performances of these three choices are comparable. T=4 is the best choice which balances the computational cost and detection rates.

TABLE 5

Performance comparison: different choices of T (standard deviation in parentheses)

| Feature | 49-D features | 81-D features | 121-D features |
|---|---|---|---|
| TN rate | 85.74% (3.34%) | 87.03% (2.12%) | 87.13% (2.41%) |
| TP rate | 86.35% (2.24%) | 88.13% (2.33%) | 89.21% (2.85%) |
| Accurac | 86.04% (1.98%) | 87.57% (1.28%) | 88.16% (2.04%) |
| AUC | 0.9252 (0.0142) | 0.9330 (0.0111) | 0.9309 (0.0131) |

In view of the experimental results, the embodiments of the invention overwhelmingly outperform the background arts in splicing detection by a significant margin. The method of feature generation process can be summarized as follows: (1) Both the test image and the corresponding prediction-error image are used; (2) Both the image and the corresponding multi-block-sized block discrete cosine transform coefficient 2-D array are used; (3) Both the image/BDCT coefficient 2-D array/their prediction-error and their wavelet subbands are used; (4) Both the moments of the CF of the 1-D histogram and the marginal moments of the CF of the 2-D histogram are used; (5) Both the first order statistical features (moments of the CF of the 1-D histogram) and the second order statistical features (marginal moments of the CF of the 2-D histogram and the transition probability matrix elements used to characterize the Markov process) are used; and (6) Considering the balance of splicing detection capability, computational complexity, and image dataset used in our experiment, we implement our scheme with 225-D features.

In order to improve the performance of methods for image tampering detection, one embodiment of the invention computes moments generated from BDCT representations with different block size to enhance the detection capability. In particular, embodiments of the invention exploit the concept that the moments of the CF of the histogram of the BDCT coefficient 2-D arrays decreases or remains the same after noise information due to splicing under the assumption that the splicing/tampering information is additive to and independent of the cover image, and with such a distribution, the magnitude of the CF of the transformed embedded signal is non-increasing from 1 to N/2 (where N is the total number of different value levels of BDCT coefficients). In addition, the moments of 2-D characteristic functions may also be included to further enhance the splicing/tampering detection capability.

It will, of course, be understood that, although particular embodiments have just been described, the claimed subject matter is not limited in scope to a particular embodiment or implementation. For example, one embodiment may be in hardware, such as implemented to operate on a device or combination of devices, for example, whereas another embodiment may be in software. Likewise, an embodiment may be implemented in firmware, or as any combination of hardware, software, and/or firmware, for example. Likewise, although claimed subject matter is not limited in scope in this respect, one embodiment may comprise one or more articles, such as a storage medium or storage media. This storage media, such as, one or more CD-ROMs and/or disks, for example, may have stored thereon instructions, that when executed by a system, such as a computer system, computing platform, or other system, for example, may result in an embodiment of a method in accordance with claimed subject matter being executed, such as one of the embodiments previously described, for example. As one potential example, a computing platform may include one or more processing units or processors, one or more input/output devices, such as a display, a keyboard and/or a mouse, and/or one or more memories, such as static random access memory, dynamic random access memory, flash memory, and/or a hard drive. For example, a display may be employed to display one or more queries, such as those that may be interrelated, and or one or more tree expressions, although, again, claimed subject matter is not limited in scope to this example.

In the preceding description, various aspects of claimed subject matter have been described. For purposes of explanation, specific numbers, systems and/or configurations were set forth to provide a thorough understanding of claimed subject matter. However, it should be apparent to one skilled in the art having the benefit of this disclosure that claimed subject matter may be practiced without the specific details. In other instances, well known features were omitted and/or simplified so as not to obscure the claimed subject matter. While certain features have been illustrated and/or described herein, many modifications, substitutions, changes and/or equivalents will now occur to those skilled in the art. It is, therefore, to be understood that the appended claims are intended to cover all such modifications and/or changes as fall within the true spirit of claimed subject matter.

What is claimed is:

1. A method for detecting image tampering comprising:
   generating, by a processing device, non-overlapping, N×N block decompositions of multiple sizes based on a two-dimensional (2-D) spatial representation of an image;
   applying N×N block discrete cosine transforms (BDCT) to the non-overlapping, N×N block decompositions to obtain corresponding BDCT coefficient 2-D arrays;
   extracting moments based on the BDCT coefficient 2-D arrays to obtain one or more feature vectors; and
   classifying the image as tampered with or not tampered with based at least on the one or more feature vectors.

2. The method of claim 1, wherein the block size N is at least one size selected from the group consisting of 2, 4 and 8.

3. The method of claim 1, wherein the image is a JPEG image, and further comprising:
   performing a JPEG decompression of the JPEG image; and
   reconstructing the 2-D spatial representation of the image from the JPEG decompression.

4. The method of claim 3, further comprising:
   performing entropy decoding of the JPEG image;
   re-ordering the entropy decoded JPEG image to obtain at least one N×N JPEG coefficient 2-D array;
   extracting Markov Process features from at least one of the at least one N×N JPEG coefficient 2-D array; and
   using at least one feature vector based on the Markov Process features in said classifying.

5. The method of claim 1 or claim 4, further comprising determining a prediction error array for at least one array selected from the group consisting of the spatial representation of the image, at least one BDCT coefficient 2-D array, and at least one JPEG coefficient 2-D array.

6. The method of claim 5, further comprising computing a discrete wavelet transform for at least one array selected from the group consisting of the spatial representation of the image, the at least one BDCT coefficient 2-D array, the at least one JPEG coefficient 2-D array, and the prediction error array.

7. The method of claim 6, wherein the wavelet transform is at least a 1-level discrete wavelet transform.

8. The method of claim 7, wherein the wavelet transform is a Haar wavelet transform.

9. The method of claim 8, further comprising determining histograms of at least one wavelet subband obtained using the discrete wavelet transform, wherein the at least one wavelet subband includes at least one low-low subband.

10. The method of claim 9, further comprising determining at least one histogram from at least one array selected from the group consisting of the spatial representation of the image, the at least one BDCT coefficient 2-D array, the at least one JPEG coefficient 2-D array, and the prediction error array.

11. The method of claim 10, wherein extracting moments further comprises applying a discrete Fourier transform (DFT) to the at least one histogram.

12. The method of claim 11, further comprising determining, based on the results of applying a DFT to the at least one histogram, at least one type of moments selected from the group consisting of first order, second order, third order moments.

13. The method of claim 5, wherein determining a prediction error array comprises, for at least one array selected from the group consisting of the spatial representation of the image, the at least one BDCT coefficient 2-D array, the at least one JPEG coefficient 2-D array:
   determining signs of respective elements of the selected array;
   determining magnitudes of respective elements of the selected array; and
   computing prediction values for respective elements of the selected array based on the signs and magnitudes.

14. The method of claim 13, wherein computing prediction values comprises:
   computing a value, $|a|+|b|-|c|$, for respective elements of the selected array, wherein $|a|$, $|b|$, and $|c|$ are magnitudes of elements of the selected array adjacent to a respective element of the selected array for which the value is being computed; and
   applying the sign corresponding to the respective element of the selected array to the value to obtain a respective prediction value of the respective element of the selected array.

15. The method of claim 6, wherein the discrete wavelet transform is one of a 1, 2 or 3 level wavelet transform.

16. The method of claim 6, wherein the discrete wavelet transform is at least one of a Haar wavelet, Daubechies 9/7 wavelet or an integer 5/3 wavelet.

17. The method of claim 14, further comprising computing a Prediction Error as a difference between the respective prediction value of the respective element and the respective element.

18. A non-transitory computer-readable medium having stored thereon instructions that, if executed by a computing device cause the computing device to perform a method for detecting tampering in an image comprising:
   generating non-overlapping, N×N block decompositions of multiple sizes based on a two-dimensional (2-D) spatial representation of the image;
   applying N×N block discrete cosine transforms (BDCT) to the non-overlapping, N×N block decompositions to obtain corresponding BDCT coefficient 2-D arrays;
   extracting moments based on the BDCT coefficient 2-D arrays to obtain one or more feature vectors; and
   classifying the image as tampered with or not tampered with based at least on the one or more feature vectors.

19. The medium according to claim 18, wherein the image is a JPEG image, and wherein the method further comprises:
   performing a JPEG decompression of the JPEG image; and
   reconstructing the 2-D spatial representation of the image from the JPEG decompression.

20. The medium of claim 18, wherein the block size N is at least one of 2, 4 or 8.

21. The method of claim 1, further comprising:
   extracting Markov Process features from at least one of the N×N BDCT coefficient 2-D arrays; and
   using at least one feature vector based on the Markov Process features in said classifying.

22. The method of claim 3, wherein N=8.

23. The method of claim 1, further comprising:
   training an image classifier to perform said classifying, said training including:
     subjecting a set of training images to said generating, said applying, and said extracting to obtain training feature vectors; and
     training the image classifier using the training feature vectors.

24. The medium of claim 18, wherein the method further comprises:
   extracting Markov Process features from at least one of the N×N BDCT coefficient 2-D arrays; and
   using at least one feature vector based on the Markov Process features in said classifying.

25. The medium of claim 19, wherein the method further comprises:

performing entropy decoding of the JPEG image;
re-ordering the entropy decoded JPEG image to obtain at least one N×N JPEG coefficient 2-D array;
extracting Markov Process features from at least one of the at least one N×N JPEG coefficient 2-D array; and
using at least one feature vector based on the Markov Process features in said classifying.

26. An apparatus, comprising an image classifier trained based at least in part on the method according to claim 23.

27. The apparatus of claim 26, wherein the image classifier comprises at least one classifier selected from the group consisting of a Support Vector Machine (SVM) classifier, a neural network classifier and a Bayes classifier.

28. An apparatus, comprising:
means for generating non-overlapping, N×N block decompositions of multiple sizes based on a two-dimensional (2-D) spatial representation of an image;
N×N block discrete cosine transform (BDCT) means to apply BDCTs to the non-overlapping, N×N block decompositions to obtain corresponding BDCT coefficient 2-D arrays;
means for extracting moments based on the BDCT coefficient 2-D arrays to obtain one or more feature vectors; and
means for classifying the image as tampered with or not tampered with based at least on the one or more feature vectors.

29. The apparatus of claim 28, further comprising:
means for extracting Markov Process features from at least one of the N×N BDCT coefficient 2-D arrays,
wherein said means for classifying is further configured to use at least one feature vector based on the Markov Process features in classifying the image.

30. The apparatus of claim 28, wherein the image is a JPEG image, and wherein the apparatus further comprises:
means for decompressing the JPEG image to obtain a decompressed JPEG image; and
means for reconstructing the 2-D spatial representation of the image from the decompressed JPEG image.

31. The apparatus of claim 30, further comprising:
means for entropy decoding the JPEG image;
means for re-ordering the entropy decoded JPEG image to obtain at least one N×N JPEG coefficient 2-D array; and
means for extracting Markov Process features from at least one said N×N JPEG coefficient 2-D array,
wherein said means for classifying is further configured to use at least one feature vector based on the Markov Process features in classifying the image.

32. An apparatus, comprising:
two or more N×N block discrete cosine transformers (BDCT) configured to perform BDCT operations of two or more sizes, N, on non-overlapping N×N blocks derived from a two-dimensional (2-D) spatial representation of an input image, to obtain respective N×N BDCT coefficient arrays;
two or more moment generators configured to generate statistical moments based on the respective N×N BDCT coefficient arrays; and
a classifier configured to classify the input image as being tampered with or not tampered with based on at least some of the statistical moments.

33. The apparatus of claim 32, further comprising:
a Markov feature generator configured to derive one or more image features based on at least one of the N×N BDCT coefficient arrays,
wherein the classifier is configured to classify the input image based additionally on one or more of the image features derived by the Markov feature generator.

34. The apparatus of claim 33, wherein the Markov feature generator is configured to generate a 2-D transition probability matrix based on the at least one of the N×N BDCT coefficient arrays.

35. The apparatus of claim 32, wherein the input image comprises a JPEG representation, and wherein the apparatus further comprises:
a JPEG decompressor configured to decompress the JPEG representation and to provide the 2-D spatial representation of the input image.

36. The apparatus of claim 35, further comprising:
an entropy decoder configured to operate on the JPEG representation to generate an entropy-decoded JPEG representation;
a reordering block to reorder the entropy-decoded JPEG representation to produce an 8×8 JPEG coefficient 2-D array; and
a feature extractor configured to extract features based on the 8×8 JPEG coefficient 2-D array, wherein the classifier is configured to classify the input image based additionally on one or more of the features extracted by the feature extractor.

37. The apparatus of claim 36, wherein the feature extractor comprises at least one feature generator selected from the group consisting of a Markov feature generator and a moment generator.

38. The apparatus of claim 32, wherein at least one of the moment generators comprises:
at least one wavelet transformer;
at least one histogram generator to provide one or more histograms based on at least one output of the at least one wavelet transformer;
at least one discrete Fourier transformer (DFT) to perform a DFT on at least one of the histograms; and
at least one moment generating block to extract at least one statistical moment from an output of the at least one DFT.

39. The apparatus of claim 38, wherein the at least one of the moment generators further comprises:
a rounding block configured to provide a rounded array of values to one of the histogram generators that is configured to perform a 2-D histogram.

40. The apparatus of claim 38, wherein the at least one of the moment generators further comprises:
a prediction error generator configured to provide a prediction error array to at least one wavelet transformer.

41. The apparatus of claim 40, wherein the prediction error generator comprises:
a sign block to obtain signs of input values of a 2-D array input to the prediction error generator;
a magnitude block to obtain magnitudes of the input values of the 2-D array;
a value estimator to generate estimated values of the input values of the 2-D array based on magnitudes of adjacent values of the 2-D array and the signs of the input values; and
a subtractor to subtract the estimated values from the input values to obtain prediction error values.

42. An apparatus, comprising:
at least one processing unit; and
a storage medium coupled to the at least one processing unit, the storage medium having instructions stored thereon that, if executed by the at least one processing unit, cause the at least one processing unit to perform a method for detecting tampering in an image, comprising:

generating non-overlapping, N×N block decompositions of multiple sizes based on a two-dimensional (2-D) spatial representation of the image;

applying N×N block discrete cosine transforms (BDCT) to the non-overlapping, N×N block decompositions to obtain corresponding BDCT coefficient 2-D arrays;

extracting moments based on the BDCT coefficient 2-D arrays to obtain one or more feature vectors; and classifying the image as tampered with or not tampered with based at least on the one or more feature vectors.

43. The apparatus according to claim 42, wherein the image is a JPEG image, and wherein the storage medium further contains instructions stored thereon such that the method further comprises:

performing a JPEG decompression of the JPEG image; and reconstructing the 2-D spatial representation of the image from the JPEG decompression.

44. The apparatus according to claim 43, wherein the storage medium further contains instructions stored thereon such that the method further comprises:

performing entropy decoding of the JPEG image;

re-ordering the entropy decoded JPEG image to obtain at least one N×N JPEG coefficient 2-D array;

extracting Markov Process features from at least one of the at least one N×N JPEG coefficient 2-D array; and using at least one feature vector based on the Markov Process features in said classifying.

45. The apparatus according to claim 42, wherein the block size N is at least one of 2, 4 or 8.

46. The apparatus according to claim 42, wherein the storage medium further contains instructions stored thereon such that the method further comprises:

extracting Markov Process features from at least one of the N×N BDCT coefficient 2-D arrays; and using at least one feature vector based on the Markov Process features in said classifying.

* * * * *

UNITED STATES PATENT AND TRADEMARK OFFICE
CERTIFICATE OF CORRECTION

| | | |
|---|---|---|
| PATENT NO. | : 8,023,747 B2 | Page 1 of 1 |
| APPLICATION NO. | : 11/673529 | |
| DATED | : September 20, 2011 | |
| INVENTOR(S) | : Shi et al. | |

It is certified that error appears in the above-identified patent and that said Letters Patent is hereby corrected as shown below:

Title page, item (54), in Column 1, line 4, under "Title", and Column 1, Line 4, delete "IMAGE/SPLICING/TAMPERING" and insert -- IMAGE SPLICING/TAMPERING --.

Title Page, item (56), under "Other Publications", in Column 2, Line 10, delete "UniversityShanghai," and insert -- University, Shanghai, --.

Title Page 2, item (56), under "Other Publications", in Column 1, Line 9, delete "Arrary" and insert -- Array --.

Title Page 2, item (56), under "Other Publications", in Column 1, Line 20, delete "Funtions" and insert -- Functions --.

Title Page 2, item (56), under "Other Publications", in Column 2, Line 10, delete "Aquisitions" and insert -- Acquisitions --.

Signed and Sealed this
First Day of May, 2012

David J. Kappos
*Director of the United States Patent and Trademark Office*